United States Patent [19]
Charlebois

[11] Patent Number: 4,776,374
[45] Date of Patent: Oct. 11, 1988

[54] ADAPTER FOR MAKING BOX JOINTS

[76] Inventor: Bernard Charlebois, C.P. 300, R.R. 1, Wilsons Corners, Canada

[21] Appl. No.: 89,822

[22] Filed: Aug. 27, 1987

[51] Int. Cl.⁴ ............................................. B27C 5/00
[52] U.S. Cl. ................................. 144/136 C; 144/83; 144/134 D; 144/203; 409/182
[58] Field of Search .......... 144/82, 83, 134 R, 134 D, 144/136 R, 136 C, 198 R, 203; 409/182

[56] References Cited

U.S. PATENT DOCUMENTS

| | | | |
|---|---|---|---|
| 2,777,485 | 1/1957 | Farrow . | |
| 2,972,366 | 2/1961 | Caruso . | |
| 3,292,494 | 12/1966 | Anderson et al. | 409/182 |
| 4,685,496 | 8/1987 | Livier | 409/182 |

*Primary Examiner*—W. Donald Bray
*Attorney, Agent, or Firm*—Cushman, Darby & Cushman

[57] ABSTRACT

In the present application there is disclosed an adapter for attachment to a hand-held power tool of the type having cutting means driven by the power tool. The adapter includes a baseplate having an opening through which the cutter may extend. Means for fixing the baseplate to the power tool a guide hingedly fixed to the baseplate and clamping means for holding the guide a predetermined distance from the cutter. The guide is sized to fit within a groove cut by the cutter and is provided with a straight edge adapted to ride in such a groove while a second groove is being cut so that box or finger joints may be made with the tool and adapter.

5 Claims, 2 Drawing Sheets

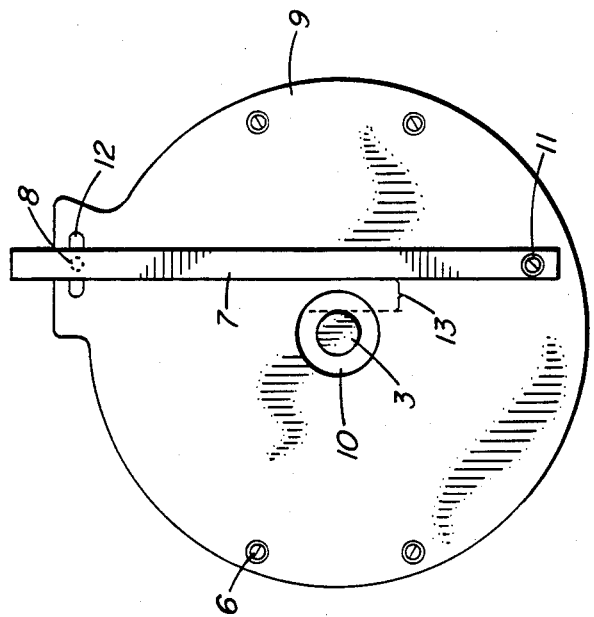
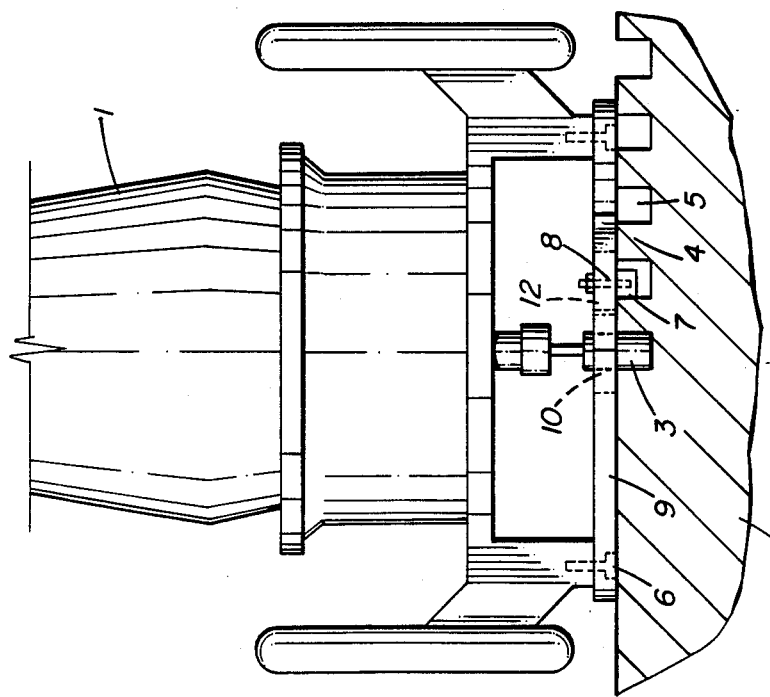

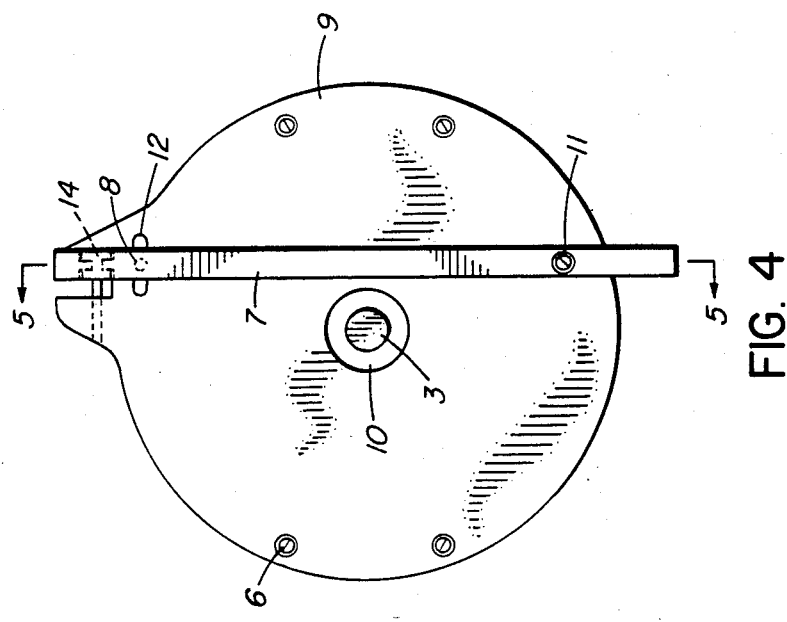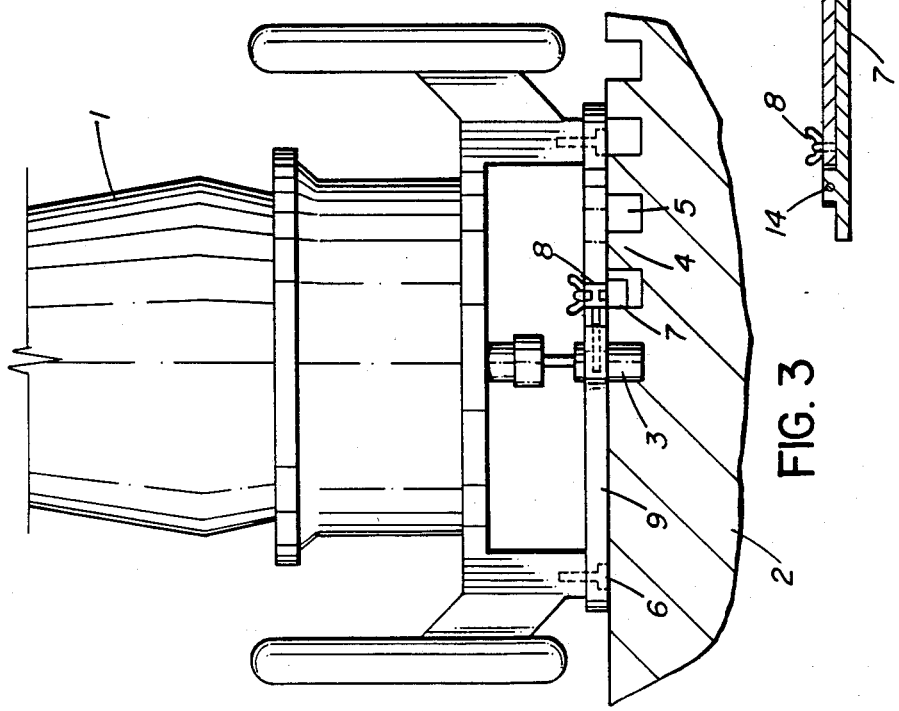

ADAPTER FOR MAKING BOX JOINTS

FIELD OF THE INVENTION

The present invention relates to hand-held power tools, and in particular, an adapter for such tools which makes it possible to cut mortise and tenon type box joints, using such a hand-held tool.

BACKGROUND OF THE INVENTION

At present box joints are cut on a fixed table saw, or the like by passing the material to be cut, on edge, over a dado cutter or a wobbler saw blade. The precision of the resulting cuts then depends not only on the accuracy of any gauge used, but also on the ability of the operator to hold the material to be cut on edge precisely perpendicular to the cutter. With large pieces of material, it is awkward to position the material, and hold it in place while traversing the cutting tool.

Known types of gauge for such prior art box joints cutters are shown for example in U.S. Pat. Nos. 2,777,485 granted to B. J. Farrow on Jan. 15, 1957, and 2,972,366 granted to A. Caruso on Feb. 21, 1961. In both of these prior patents, gauges are shown for attachment to fixed or bench type saws, to control the spacing of successive cuts. The material to be cut is moved past a fixed cutter. Canadian Pat. No. 641,661 granted to the Porter-Cable Machine Company on May 22, 1962, discloses a router guide mounted from the upper surface of a baseplate and intended to engage an edge of a work piece to guide the router. This structure is complex involving rods slideably mounted and secured in boxes by screws. A guide plate with a depending flange is fixed to the rods by a support plate. Various other parts are also required to complete the structure.

Box joints at one time used to be cut by hand. This was both time-consuming and subject to mistakes of marking and/or imprecise cutting. Machines were later invented with multiple cutting blades into which the material was fed —those machines are complex and correspondingly expensive. Other means have also been devised for cutting box joints. These included a mobile apparatus sliding on top of table saws, or table-mounted routers, as disclosed in the aforesaid U.S. Patents. However, they were limited by the maneuverability and the wieght of the material being processed.

SUMMARY OF THE INVENTION

In contrast, my invention permits the material to be held stationary, and a movable cutter, such as a router or circular saw fitted with the adapter of the present invention, to cut successive mortises from the material with greater speed and precision than previously possible. The size and weight of the material cannot affect the precision of the cuts, and the quality of the finished joint. The adapter in accordance with the present invention is small and light and may therefore be used on hand-held power tools.

This adapter is used to cut box joints (also known as finger joints). It serves as a guide and it is fixed to the chosen machine. The adapter has one adjustable part so that snug or loose joints may be obtained.

The width of the box joint is determined by the diameter of bits for the router, thickness of blades and setting of wobblers for the circular saw, width of dado knives, or varying width of other cutting tools. When the width is set on the adapter, this invention will permit cutting uniformly spaced grooves with precision. Given the proper cutting knives, blades, or other cutting tools, it can be used to cut a variety of materials, such as wood, plastic, fiberglass, plexiglass, paper, cardboard, and some metals.

The adapter of the present invention represents a substantial improvement in means for cutting box joints. It is as easy to use as the portable machine chosen; it is not necessary to move the material. The apparatus is not limited to a maximum width of panels, and a large number of panels can be processed in the same operation.

In accordance with the present invention, an adapter for a hand-held power tool comprises a baseplate, having an opening through which a cutter may extend, means for fixing said baseplate to said tool, a finger or guide hingedly fixed to said baseplate, and clamping means for holding said guide a predetermined distance from said cutter, said guide being sized to fit within a mortise or groove cut by said tool, and having a straight edge adapted to ride against the edge of a first mortise while a second mortise is being cut to locate said second mortise precisely in relation to said first mortise.

BRIEF DESCRIPTION OF THE DRAWINGS

In drawings which illustrate and embodiment of the present invention for use with a router, FIG. 1 is an elevation of a router cutting a succession of grooves or mortises, FIG. 2 is a plan view of the adapter of FIG. 1, FIG. 3 is an elevation similar to FIG. 1, with a modified adapter, FIG. 4 is a further form of adapter, and FIG. 5 is a section on the line 5—5 of FIG. 4.

DETAILED DESCRIPTION OF THE INVENTION

Referring to FIG. 1 there is disclosed a router 1 having a baseplate 9 fixed to this router 1 with suitable fasteners 6 with an aperture 10 in the baseplate 9 through which a cutter 3 extends for cutting a series of tenons 4 and mortises 5 to form a box joint. As illustrated in FIG. 1 the cutting of a mortise is controlled by the finger or guide 8 having a guiding surface 7 which is held against the side of a previous mortise adjacent the cutter.

FIG. 2 illustrates the baseplate of FIG. 1 from beneath, showing the baseplate 9, the fasteners 6, the aperture 10, the cutter 3, the finger 7, and the adjusting screw 8. As shown in FIG. 2, the finger 7 is pivoted to the baseplate at 11 and is held in position by means of the adjustable fastener 8 engaged in the slot 12.

FIG. 3 is a view similar to FIG. 1 illustrating an alternative form of baseplate 9 including a wing nut 8 for securing the finger 7 to the baseplate 9 and a micrometer adjustment 14 for precisely locating the finger 7 before the wing nut 8 is locked in place.

FIG. 4 illustrates the construction of this alternative baseplate with the wing nut 8 and the slot 12 and the micrometer adjustment 14. FIG. 5 is a section through the finger 7.

The following is a description of a typical way of using this invention, using straight-edged wood panels. Because there are four sides to a box, the wood panels 2 are lined up four at a time, end grain up. (You may use whatever multiple of four you wish.) Clamp the panels 2 together securely. Now choose a knife for the router of a perdetermined diameter. Set the guide 7 so that the diameter of the bit 3 is the same as the space 13 between the bit and the guide 7 (See FIG. 2.) The first cut is performed with the guide 7 sliding against the edges of the panels 2. The next cut is performed with the guide 7 sliding into the groove 5 which has just been cut, while holding the guide against the side towards which the next groove 5 will be cut. This process is continued groove by groove. The width of the panel is not limited by this process, as one simply proceeds with the same operation until one reaches the end. Now, half the grooves of the box have been done. Turn the panels 2, still clamped together, so that the other ends are up. Proceed as with the first set of grooves. The box joints are now complete and ready to assemble.

The adapter of the present invention includes a smooth baseplate 9 below which a cutter 3 extends. The adapter regulates the width of the groove (5) by sliding against the side of the preceeding groove. The baseplate 9 of the adapter provides means for fixing the guide to the tool. The baseplate includes a hole or slot (10) for knives or blades (3). The baseplate provides holes with recessed cavities for the heads of bolts or screws (6) which are lined up with threaded holes in the machine, as means of fixation to the machine. The baseplate also provides means for adjustment (12, 14) for the guide 7 part.

The finger or guide (7) determines the width of a tenon by sliding against the previous tenon (4). The guide 7 is provided with holes having recesses (11) for the heads of bolts or screws which are lined up with threaded holes 12 of the plate. Means of adjustment (12, 14) cooperate with the baseplate to precisely hold the guide in the correct position.

I claim:

1. An adapter for a hand-held power tool comprising a baseplate having an opening therethrough through which a cutter may extend, means for fixing the said baseplate to said tool, a finger or guide hingedly fixed to said baseplate, and means for adjusting the position of said guide with relation to said baseplate, said guide having a thickness no thicker than the cutter, and having a straight edge adapted to ride against the edge of a plurality of panels whereby a mortise may be formed in said panels.

2. An adapter as defined in claim 1 wherein said hand-held power tool is a router.

3. An adapter as claimed in claim 1 wherein said clamping means for holding said guide a predetermined distance from said cutter includes a micrometer adjustment for precisely locating the guide in relation to said baseplate and means for locking said guide with relation to said baseplate.

4. An adapter for mounting on a hand held power tool for making box joints said adapter including having means therein for attachment to said tool and including a hole or slot through which knives or blades may project, a guide hinged to said baseplate, said baseplate being further provided with clamping means for holding said guide a predetermined distance from said blade or cutter, said guide being sized to fit within a mortise or groove cut by said blade or cutter and having a straight edge adpated to ride against the edge of a first mortise while a second mortise is being cut thereby to locate said second mortise precisely in relation to said first mortise.

5. An adapter for a power tool as claimed in claim 4 wherein said power tool is a router.

* * * * *